United States Patent

[11] 3,622,987

[72] Inventor Harold Borkan
Princeton, N.J.
[21] Appl. No. 821,615
[22] Filed May 5, 1969
[45] Patented Nov. 23, 1971
[73] Assignee The United States of America as represented by the Department of the Army

[54] COUNT COMPARISON CIRCUIT
9 Claims, 1 Drawing Fig.

[52] U.S. Cl. .......... 340/146.2, 89/6, 102/82
[51] Int. Cl. .......... G06f 7/00
[50] Field of Search .......... 340/146.2; 235/177, 92 CA, 92 CM, 92 EC; 307/203; 89/6; 102/82

[56] References Cited

UNITED STATES PATENTS

| | | | |
|---|---|---|---|
| 3,049,693 | 8/1962 | Shapin, Jr. | 340/146.2 X |
| 3,102,994 | 9/1963 | Stampler | 340/136.2 |
| 3,274,379 | 9/1966 | Hinrichs | 235/177 |
| 3,319,224 | 5/1967 | Ulrich | 340/146.2 |
| 3,508,198 | 4/1970 | Coombs, Jr. | 340/146.2 |
| 3,517,175 | 6/1970 | Williams | 235/177 |
| 3,371,334 | 2/1968 | Asher et al. | 235/92 X |
| 3,371,579 | 3/1968 | Kinzelman | 235/92 X |
| 3,414,719 | 12/1968 | Petzold | 235/92 |

*Primary Examiner*—Charles E. Atkinson
*Attorneys*—Harry M Saragovitz, Edward J. Kelly, Herbert Berl and J. D. Edgerton

ABSTRACT: Disclosed is a count comparison circuit for use in artillary fuze timers and the like. The comparison circuit comprises a counting register and a storage register. The complement of the number to be detected is stored in the storage register. OR gates are coupled to the corresponding stages of the registers and when the count is reached the OR gates activate and AND gate to produce an electrical output.

PATENTED NOV 23 1971 3,622,987
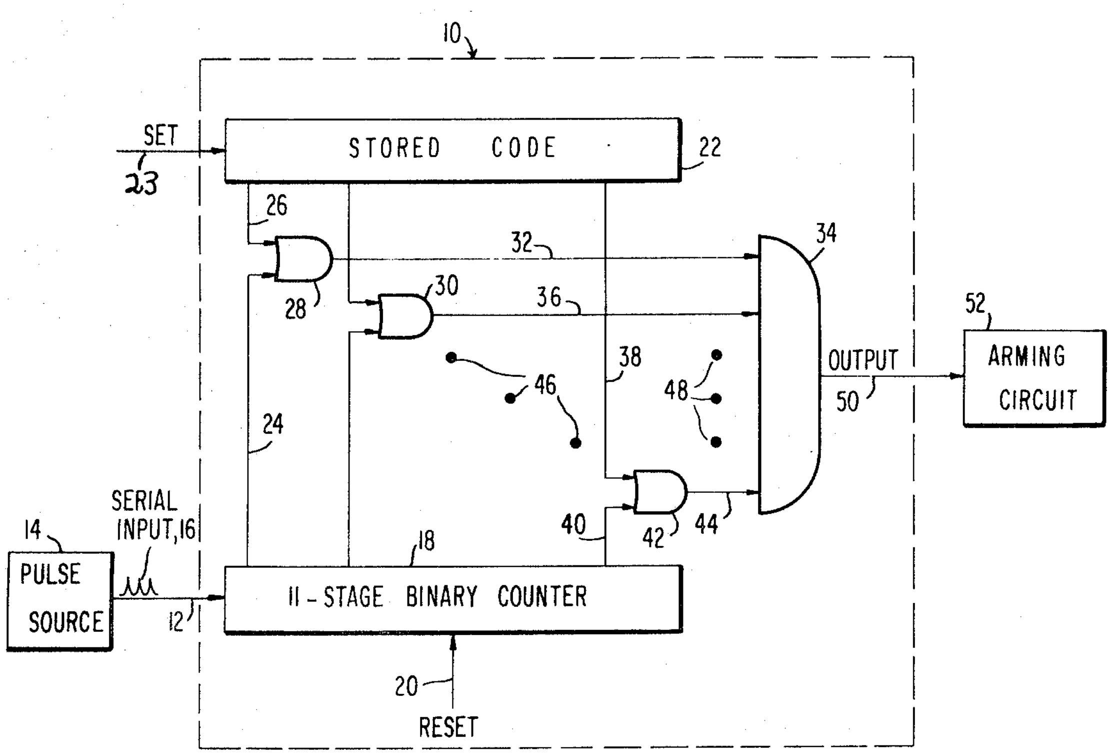
INVENTOR
HAROLD BORKAN
BY Harry M. Saragovitz, Edward J. Kelly, Herbert Berl, + J. D. Edgerton
ATTORNEYS

COUNT COMPARISON CIRCUIT

This invention relates to a count comparison circuit for determining when a predetermined digital number has been reached in a counter. More particularly, it relates to a simplified pulse counter particularly adapted for use as a digital timer in artillery fuzes and the like.

Count comparison circuits are well known and are used in a variety of applications to produce an output when a predetermined number has been reached in a digital counter or register. However, for the most part devices of this type have been relatively complex and expensive and are not particularly suited for use in artillery fuze timers and other applications where a lightweight, simplified and inexpensive comparator is required. The present invention avoids these difficulties by providing a fully electronic device incorporating digital logic circuits for producing count comparison in a simplified and reliable manner. Because of its simplicity and light weight, it is desired to arm a projectile a predetermined time after it has been fired or after some other event has taken place. While particularly described for use in conjunction with an artillery fuze timer, the count comparison circuit of this invention is suitable for application wherever it is desired to ascertain when a predetermined count has been reached by a digital counting device such as a binary counter or register.

In the present invention, the electrical pulses or other signals to be counted are supplied to an $n$-stage binary counter or register. The complement of the predetermined required count is previously inserted in a storage device, such as a comparison register. An OR logic gate (either real or virtual) is used at the output of each stage of the two registers and these drive an $n$-input AND gate. When all OR gates are activated, the required count has been inserted into the binary counter or register.

More particularly, the device of the present invention makes it possible to readily determine when a count A has been reached in an $n$-stage binary counter $A$ is less than $2^n-1$. The stored count register is preloaded with the complement of $A$ or $\bar{A}$ where $\bar{A}=(2^n-1)-A$. Each of the $n$ outputs of the variable register and its companion output from the stored count register is applied to a two-input OR gate. In this case, $n$ OR gates are required. The output of each OR gate yields a "1" output if either of its inputs is a "1." The output of each OR gate yields a "1" output only if all its inputs are at "1" levels. The result is a simplified electronic logic system incorporating only a pair of digital registers and a plurality of logic circuits for readily determining when a predetermined count has been reached.

It is therefore one object of the present invention to provide an improved count comparison circuit.

Another object of the present invention is to provide a count comparison circuit particularly adapted for use in artillery fuze timers.

Another object of the present invention is to provide a fuze timer incorporating a simplified count comparison circuit.

Another object of the present invention is to provide a count comparison circuit comprising a pair of $n$-stage binary registers wherein the complement of the number to be detected is stored in one of the registers.

Another object of the present invention is to provide a count comparison circuit for detecting a preselected count in an $n$-stage binary counter or register wherein the complement of the required count is inserted in a comparison register and a plurality of logic gates are connected to each of the registers to produce an output when the predetermined count is reached.

These and further objects and advantages of the invention will be more apparent upon reference to the following specification claims and appended drawings wherein:

The single FIGURE of the drawing illustrates the count comparison circuit of the present invention incorporated in a fuze timer.

Referring to the drawing, the novel count comparison circuit of the present invention is generally indicated within the dash box 10. The count comparison circuit is provided with an input lead 12 connected to a pulse source 14 which by way of example only may be a source of clock pulses or timing pulses for a fuze timing circuit. Source 14 produces a series of equally spaced pulses indicated at 16 which are serially applied to the input lead 12 of the timer and to an 11-stage binary counter or register 18. Register 18 is shown as having a reset input lead 20 such that when a signal is applied to the reset lead the entire counter 18 resets all stages to zero.

Connected to binary counter 18 is a storage register 22 illustrated as also having eleven stages in which is stored in a conventional manner the complementary code of the count to be determined. The complementary code is inserted into storage register 22 by way of lead 22. The first stage of counter 18 and register 22 are connected by respective leads 24 and 26 to the two inputs of an OR-gate 28. Similarly, the second stage of the counter 18 and storage register 22 are connected to a second OR-gate 30. The output of the first OR-gate 28 is connected by lead 32 to one input of an AND-gate 34 and similarly the output of the second OR-gate 30 is connected by a lead 36 to a second input of AND-gate 34. The 11th and last stage of the binary counter 18 and storage register 22 are connected by leads 38 and 40 to an 11th OR-gate 42 having its output connected by lead 44 to the 11th input of AND-gate 34. It is understood that the remaining intermediate stages of binary counter 18 and storage register 22 are similarly connected to OR gates indicated symbolically by the dots at 46 and each of the OR-gates 36 have their outputs connected to respective inputs of AND-gate 34 as indicated symbolically in the drawing by the dots 48. The output of AND-gate 34 is taken by way of output lead 50 and supplied by way of example only to a conventional arming circuit for an artillery projectile indicated at 52.

As illustrated by way of example only, counter 18 is illustrated as an 11-stage binary counter. It is understood that counter 18 may take the form of a serial input/parallel output $n$-stage binary counter and/or shift register that may be reset to zero state by an input signal on lead 20. Counter 18 is used to accumulate the count that requires comparison from the pulse source 14. Register 22 in which the complementary code is stored may be an additional shift register, counter or wired matrix. The number stored in binary shift register 22 is the complement (sometimes called the base minus 1 complement) of the desired number.

It is assumed that a number or code A is to be identified in counter 18 where $A<2^n-1$. Then the number stored in register 22 is the complement of A or $\bar{A}$ where $\bar{A}=(2^n-1)-A$. Each of the outputs of the variable register 18 and its companion output from the stored-count register 22 is applied to the input of an OR gate such as the OR-gates 28, 30 42 and those illustrated at 46 in the drawing. It is apparent that $n$ OR gates are required. The output of each OR gate will yield a "1" output if either of its inputs is a "1". All OR gate outputs are applied to the $n$ inputs of AND-gate 34 which yields a "1" on output on lead 50 only if all inputs are at "1" levels. The system is shown and described using OR and AND gates but it is understood that these may be replaced if desired with NOR and NAND gates.

As an example of how the count detector 10 operates consider detecting the arbitrary number 38 in a six-bit system. That is, assume six stages for each of the registers 18 and 22 and assume that it is desired to produce an output on lead 58 when 38 pulses 16 have been applied to the register 18 from pulse source 14. In this case the count to be determined $A=38=^5+2^2-2^1=100110$. Since in the example given for six stages $n=6$, complementary number stored in register 22 is 25, i.e., $\bar{A}=(2^n-1),-A=(2^6-1)-38,=25$. For this condition an output will be produced on lead 50 to arm circuit 52

$$\begin{array}{rl} A=38= & 2^5+\qquad\qquad 2^2+2^1 \qquad =100110 \\ \hline \bar{A}=25= & \qquad 2^4+2^3+ \qquad\qquad +2^0=011001 \\ \hline A+\bar{A}=63= & 2^5+2^4+2^3+2^2+2^1+2^0=111111 \end{array}$$

In other words, an output will be produced on lead 50 when a signal is supplied simultaneously to every OR gate either from count register 18 or from storage register 22. That is, when A progresses from its first count, 000001, (after counter 18 has been reset to zero) it does not simultaneously activate outputs $2^5$, $2^2$, and $2^1$, until count 38. It will of course activate these plus some others at higher counts, for example 39, 54, 55, etc., but in preset timer applications such as artillery fuze timers only the first coincidence is of interest and once the arming circuit 52 is actuated it is no longer responsive to further outputs on lead 50.

It is apparent from the above that the present invention provides an improved and simplified electrical circuit for determining when a digital count has been reached. While described in conjunction with binary counting it is apparent that the present invention is applicable to all types of digital codes including decimal, binary, binary-coded-decimal, and the like. The simplified circuit of the present invention involving small space and light weight is particularly adapted for fuze timers where the number of pulses from the pulse source 14 is directly proportional to the lapse of time from a predetermined event such as the firing of an artillery projectile. Although described in conjunction with a particular application involving fuzing, it is apparent that the count comparison circuit 10 of the present invention is usable wherever it is desired to determine when a predetermined digital count has been reached.

What is claimed and desired to be secured by United States Letters Patent is:

1. A circuit for detecting a preselected count comprising a count accumulator for sequentially accumulating a count, said accumulator having at least *n* stages each capable of assuming one of at least 2 states, a storage device having at least *n* stages each capable of assuming one of at least two corresponding states, means for setting said stages of said storage device into states representative of the complement of said count, means coupled to the *n* stages of both said count accumulator and said storage device for producing an output when *n* successive stages of the accumulator and storage device are in complementary states and a load circuit for responding to the output and terminating further operation of the count detecting circuit.

2. A circuit according to claim 1, wherein said stages of said count accumulator and said storage device are binary stages, said accumulator accumulating a count $A$ where $A < 2^n - 1$, said storage device including means for setting its stages to states representative of $2^n - 1) - A$.

3. A circuit according to claim 2 wherein said count accumulator and said storage device are both parallel output registers.

4. A circuit according to claim 2 wherein said count accumulator is a serial input/parallel output *n*-stage binary shift register.

5. A circuit according to claim 2 wherein said coupling means comprises a plurality of logic gates.

6. A circuit according to claim 5 including *n* first gates of the same type each having two inputs coupled to corresponding stages of said count accumulator and said storage device, respectively and a second gate of a different type having *n* inputs, each input of said second gate being coupled to the output of respective first gate.

7. A circuit according to claim 6 wherein said first gates are OR gates, and said second gate is an AND gate.

8. A timing circuit according to claim 6 including a pulse timer source coupled to the input of said count accumulator.

9. A timing circuit according to claim 8 wherein said pulse timer is a fuze timer and said load circuit is a projectile arming circuit.

* * * * *